Sept. 7, 1926.
R. F. DALTON
1,599,216
FORMATION OF BLOCKS OF TERRA COTTA OR THE LIKE
Filed Nov. 24, 1922    2 Sheets-Sheet 1
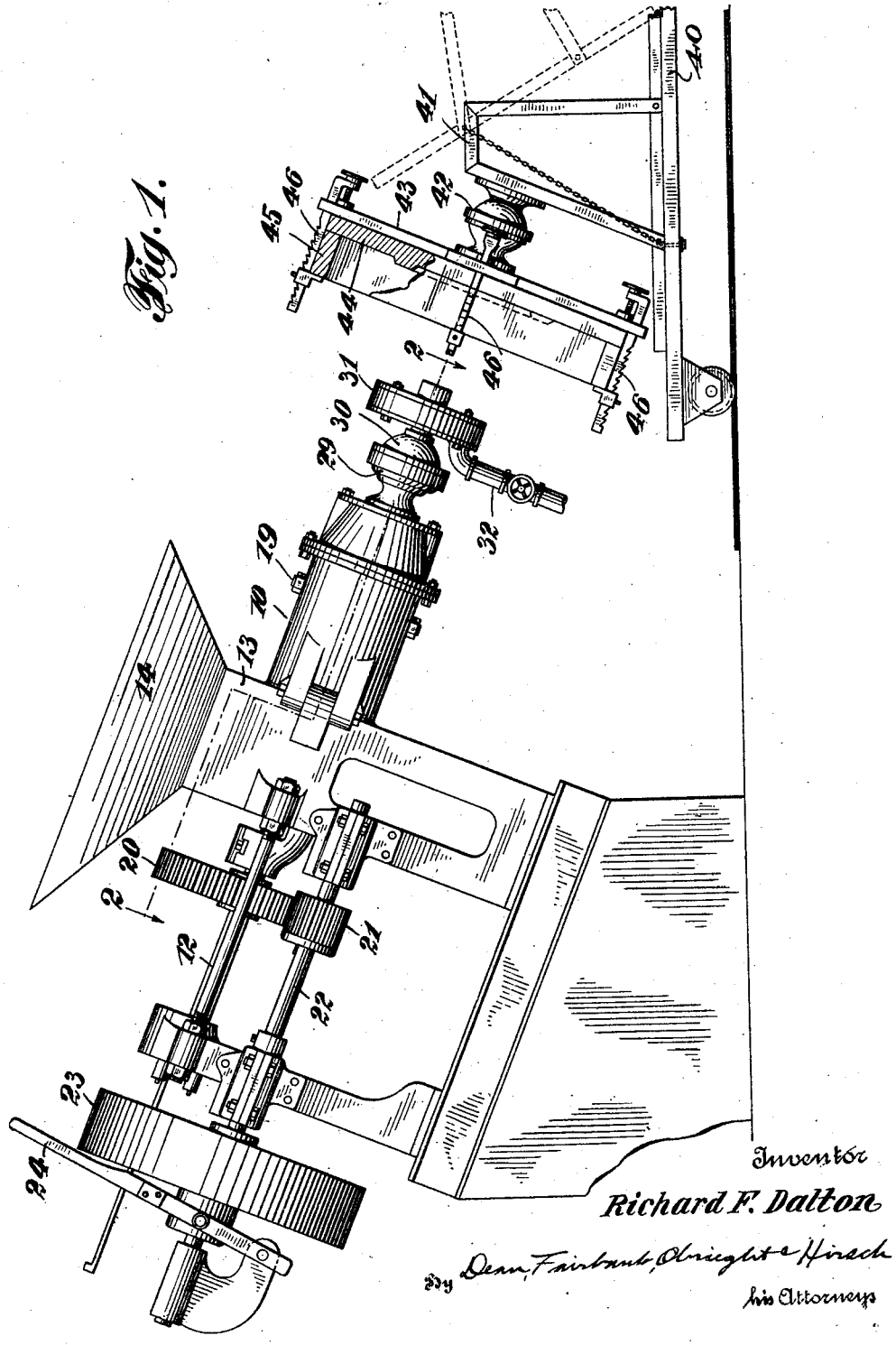
Inventor
Richard F. Dalton
By Dean, Fairbank, Albright & Hirsch
his Attorneys Sept. 7, 1926.                                             1,599,216
R. F. DALTON
FORMATION OF BLOCKS OF TERRA COTTA OR THE LIKE
Filed Nov. 24, 1922    2 Sheets-Sheet 2
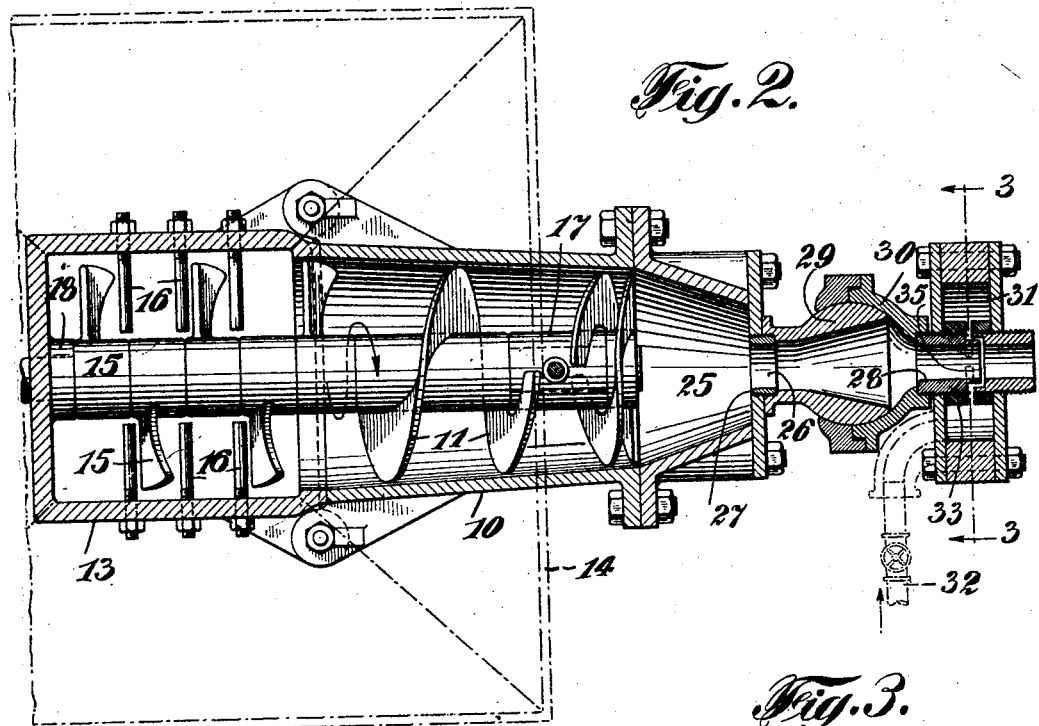
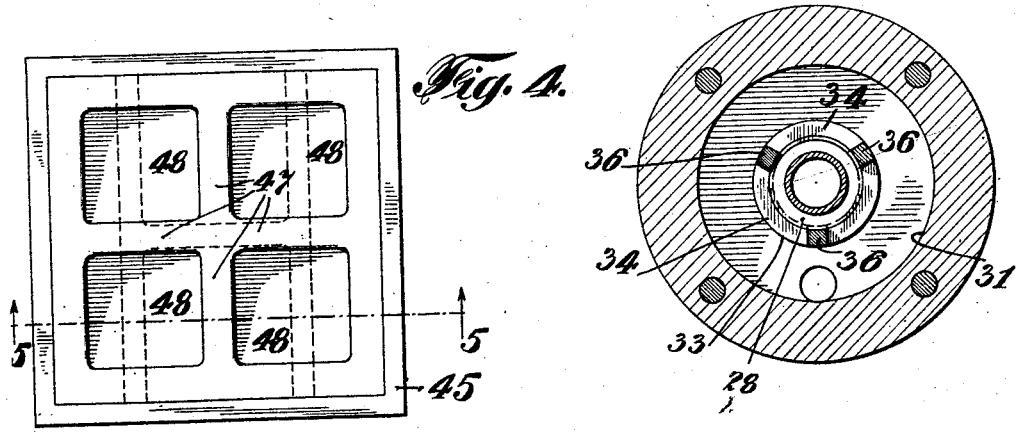
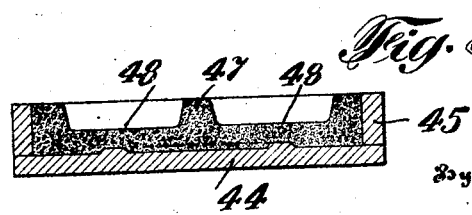
Inventor
Richard F. Dalton
By *Dean, Fairbank, Albright & Hirsch*
his Attorneys Patented Sept. 7, 1926.

1,599,216

UNITED STATES PATENT OFFICE.

RICHARD F. DALTON, OF NEW ROCHELLE, NEW YORK.

FORMATION OF BLOCKS OF TERRA COTTA OR THE LIKE.

Application filed November 24, 1922. Serial No. 602,934.

In the manufacture of architectural terra cotta, it is common practice to use a mixture of pulverized clay and ground saggar, or other burned clay ware with sufficient water to give the desired plasticity for molding purposes.

Various mechanical processes and apparatus have been experimented with for filling the molds with this material to avoid hand filling by skilled and high priced labor, but so far as I know, none has proved practical or is now in common use. This is in part due to the fact that the molds in which the material is to be packed or pressed vary as to shape and size, and in part to the fact that to produce a satisfactory product the material must be so packed that all of the particles of saggar or other grit are worked away from the surface of the mold, leaving only the fine clay exposed on the finished or molded surface in order to make the surface of the desired smoothness and uniform character. I have discovered that I can accomplish this result by delivering the material by means of my improved process and apparatus, and with the use of a pneumatic blast so that the material is projected or blown into the mold or against the molding face. The resulting impact force or pressure is such that the minute particles of clay either strike the face before the coarser grit particles, or are forced around or in front of such coarser particles, and the resulting finished surface is of the desired smoothness without exposed coarse particles of the grit.

In carrying out my invention the mixture or terra cotta body is propelled solely by the forward moving action of an auger blade or screw conveyor into a delivery pipe of substantially constant diameter, and passes as a rod of clay to the point of ultimate discharge. The material is not subjected to any pressure except that of the auger blade, and that is only sufficient to keep the material moving. This movement is uniform and dependent upon the pitch, speed and character of the auger, and may be stopped at any instant by stopping the auger. The mixed material may be fed to the auger through any suitable form of hopper so that the delivery may be uninterruptedly maintained for a long period of time. The air is introduced into the constant diameter delivery pipe, and in such a way and under such pressure as to cut into the solid rod of moving clay so that particles are projected by the air through the outlet and delivered to the mold with the desired force and to apply the desired pressure against the mold wall or against the material previously delivered to the mold. The mold and delivery outlet are so mounted in respect to each other that the mixture may be delivered to any part of the mold and in any desired direction in respect to the face of the mold.

In the accompanying drawings I have illustrated one form of apparatus embodying my invention, and by means of which my improved process may be carried out.

In these drawings:

Fig. 1 is a side elevation.

Fig. 2 is a section substantially on the line 2—2 of Fig. 1.

Fig. 3 is a section on the line 3—3 of Fig. 2.

Fig. 4 is a face view of a filled mold, and

Fig. 5 is a section on the line 5—5 of Fig. 4.

In the apparatus illustrated there is provided a cylinder or chamber 10 open at opposite ends and provided with means for advancing the terra cotta body or clay mixture and imparting the necessary but comparatively slight pressure required to advance it to the delivery outlet. The advancing means is preferably in the form of a screw propeller or auger blade 11 mounted on a shaft 12. At one end of the cylinder 10 there is preferably provided a receiving and mixing chamber 13 which opens at its upper side into a hopper 14. The shaft 12 extends through the chamber 13 and is provided with mixing blades 15 which cooperate with projections 16 on the inner walls of the chamber so as to effect a final and thorough pugging of the material. The blades 15 are preferably slightly inclined so as to tend to feed the material toward the entrance end of the cylinder 10 and to the auger blade 11 within the latter. The shaft may be supported in any suitable manner, as for instance by a bearing 17 within the cylinder and a bearing 18 at the opposite end of the mixing chamber 13. The bearing 17 may be supported from the walls of the cylinder by a transverse rod 19. For driving the shaft I have illustrated it as being provided with a gear 20 meshing with a pinion 21, and have illustrated the shaft 22 of the pinion as being provided with a belt pulley 23 connected to the shaft by means of a clutch operated by a clutch lever 24. It will of course be evident that the shaft 12 might be connected to any suitable source of power in various other ways.

The parts of the apparatus so far described may be replaced by any other mechanically equivalent parts, and form no portion of my invention except in combination with the parts to which the material is delivered, and about to be described.

At the end of the cylinder 10 opposite to the mixing chamber there is provided a conical chamber 25, the larger or base end of which is of the same diameter as the end of the cylinder, while the smaller end delivers through a passage 26 leading to a tube section or delivery nozzle 28. Between the chamber 25 and the nozzle is a universal joint including a ball section 29 and a socket section 30. The passage within the ball section is flared so that the nozzle 28 may be swung in any desired direction in respect to the body of the machine without interuupting the free flow of material to and through the nozzle. This delivery nozzle is of uniform diameter throughout and of substantially the same diameter as the outlet from the chamber 25.

Surrounding the nozzle is an air chamber 31 to which air under the desired pressure may be delivered from any suitable source and through flexible hose 32 or other conduit means so designed that the flow of air to the chamber 31 will not be interrupted or interfered with by the swinging movement of the nozzle. The nozzle intermediate of its ends has an air inlet from the chamber 31 and so designed that the air enters the main central passage through the nozzle in a direction at an angle to the path of movement of the material through the nozzle. As illustrated, the nozzle is formed of two spaced sections held in the desired relationship by a sleeve 33 which latter has a series of slots 34 adapted to register with the annular slot 35 between the two sections of the nozzle. The end portions of the sleeve 33 are connected by narrow bar portions 36 by means of which the parts are held rigid in respect to each other, leaving the annular slot 35 in the nozzle uninterrupted so that air may enter the nozzle radially at any and all points about the circumference of the latter. Preferably the two nozzle sections have their opposing ends at the slot 35 so formed as to slightly telescope and thus reduce the liability of clay being forced out through the slot when the air pressure is shut off.

Although the apparatus may be so mounted that the nozzle 28 normally projects in any desired direction, the preferred mounting is such that the axis of the mixing chamber and auger blade is inclined at an acute angle to the horizontal so as to deliver in a direction having a downward component.

In connection with the apparatus above described there is provided a mold support by means of which the position of the mold in respect to the delivery apparatus may be varied. As shown, there is provided a truck or carriage 40 having a standard or frame 41 thereon connected by a universal joint 42 to a mold supporting plate or frame 43. These parts are so designed that the normal axis of the universal joint may be substantially in alignment with the axis of the delivery apparatus, but the mold may be brought toward or from the delivery nozzle and may be tilted at various angles in respect to the latter. The mold frame 41 is so hinged on the carriage that it may be swung back to bring the filled mold to a substantially horizontal position for ease of removal, and without altering the adjustment of the universal joint. I do not wish to be limited to this specific form of mold support, as various other means might be designed whereby the desired and easy adjustment of the mold might be secured.

The mold will of course vary with the size, shape and character of the article to be molded. Merely as an example I have shown a mold including a face plate 44 and peripheral walls 45 held to the support 43 by means of clamps 46 adapted for various sizes of molds. The face plate, as well as the peripheral walls, may have any desired surface irregularity, figure or design to give the desired shape and form to the finished terra cotta block. In filling the mold the material is projected from the nozzle 28 until it has been filled up to the desired thickness against the face plate 44 and the peripheral walls 45, and in addition there may be built up transverse partitions 47 of the material to leave chambers or cavities 48 in the rear of the molded material. As these partitions are not exposed when the block is completed, burned and installed in place, they may be put in by hand after the material has been built up and thoroughly compacted against the face plate and peripheral walls of the mold, and to the desired thickness.

In the operation of my improved apparatus a solid rod of the clay mixture will be continuously delivered by the action of the auger blade and under comparatively slight pressure. Before the air is turned on this rod-like and comparatively stiff body of the plastic material will break off in sections after protruding from the nozzle, or will form coils and may be received in any suitable container and returned from time to time to the hopper 14. When the mold is in proper position and the operator is ready to begin filling the latter, the air pressure is turned on and as the air enters the slot 35 it cuts off the clay-rod in advance thereof and projects it from the nozzle, and thereafter as fast as the clay passes the slot 35 the air cuts in behind particles or lumps of it and projects such particles or lumps through the outlet of the nozzle and at high velocity into the mold and against the desired wall surface thereof. The operation may be continued and the angle of the nozzle, as well as the angle of the mold, varied until the desired amount of material has been filled up in the mold, and thereafter the air pressure is cut off and the mold removed. Preferably the mixing apparatus and the auger blade operate continuously and the operator controls the delivery of the material from the nozzle to the mold by turning on or off the air pressure. The solid stream or rod delivered through the nozzle when the air is shut off may be at the desired rate, depending upon the speed of rotation of the auger blade, and it tends to keep the nozzle clean and prevents any drying or hardening of the material in any part of the apparatus during a change of molds between filling periods. Furthermore, it insures that the material projected into a mold upon the turning on of the air pressure will be a freshly mixed portion of the material, rather than an exposed and slightly dry portion as would be the case were the auger stopped between successive mold filling operations. The force of delivery, as well as to a certain extent the size of the delivered particles or lumps, may be controlled not only by varying the air pressure, but also by controlling the speed of the auger.

By delivering the terra cotta body to the mold as above described, the resultant action is that in the finished block the coarser particles of grit are found to occupy positions spaced slightly away from the walls of the mold so that the portions of the terra cotta mixture which are in contact with the mold walls are substantially pure clay of uniform character. Thus when the block is removed from the mold for drying, it is found that the surfaces are smooth and require little or no hand treatment before burning.

Although my improved process and apparatus are particularly intended for use with terra cotta mixtures, and for forming blocks to be baked or burned to harden the same, it will of course be evident that certain features of the invention, particularly as regards the construction of the apparatus may be useful for delivering other plastic material.

Having thus described my invention, what I claim as new and desire to secure by Letters Patent is:

1. An apparatus for filling molds with stiff plastic material such as terra cotta body, including a mixing apparatus, a screw conveyor receiving material therefrom, a delivery nozzle and connections between said conveyor and nozzle for delivering to the nozzle a continuous bar of material under the action of the conveyor, said nozzle being of substantially uniform diameter throughout its length, and having means for delivering air under pressure thereto intermediate of the ends thereof to project the material from the nozzle.

2. An apparatus for forming molded masses of stiff plastic material such as terra cotta body, including a nozzle having a passage therethrough of uniform diameter and provided with a compressed air inlet intermediate of the ends thereof, and means for delivering the material to said nozzle and past said air inlet.

3. An apparatus for forming molded masses of stiff plastic material such as terra cotta body, including a nozzle having a passage therethrough of uniform diameter and provided with a compressed air inlet intermediate of the ends thereof, a conduit connected to said nozzle, and a screw conveyor for delivering material to and through said conduit.

4. An apparatus for delivering stiff plastic material to form molded masses, including a mixer for the material, a screw conveyor receiving material from said mixer, a conduit receiving material from said conveyor and including a ball and socket joint, and a nozzle at the end of said conduit and having an inlet for compressed air.

5. An apparatus for delivering stiff, plastic material, including a nozzle having a passage therethrough of substantially uniform diameter terminating at a discharge outlet of the full size of the nozzle, and an air chamber encircling said nozzle intermediate of the ends of the latter, said nozzle having an air inlet through the wall thereof intermediate of the ends of the nozzle from said air chamber.

6. An apparatus for delivering stiff, plastic material, including a nozzle having a passage therethrough of substantially uniform diameter, and an air chamber encircling said nozzle intermediate of the ends of the latter, said nozzle having an annular slot intermediate of the ends thereof constituting an air inlet from said air chamber to the nozzle.

7. An apparatus for delivering stiff, plastic material, including a nozzle having a passage therethrough of substantially uniform diameter, the outlet end discharging directly into the atmosphere, an air chamber encircling said nozzle, said nozzle having an annular slot intermediate of its ends constituting an air inlet from said air chamber to the nozzle, means for continuously delivering said material through said nozzle past said slot, and controllable means for admitting compressed air to said air chamber and nozzle at will to project material from said outlet.

Signed at Long Island City in the county of Queens and State of New York this 22nd day of November A. D. 1922.

RICHARD F. DALTON.